United States Patent [19]

Nishi et al.

[11] Patent Number: 4,592,640

[45] Date of Patent: Jun. 3, 1986

[54] STROBOSCOPIC LAMP SYNCHRONIZING DEVICE

[75] Inventors: Kohichi Nishi, Yokohama; Akira Takahashi, Kawasaki, both of Japan

[73] Assignee: Ricoh Company, Ltd., Japan

[21] Appl. No.: 677,184

[22] Filed: Dec. 3, 1984

[30] Foreign Application Priority Data

Dec. 1, 1983 [JP] Japan ............................ 58-227402

[51] Int. Cl.⁴ .................. G03B 7/087; G03B 7/16; G03B 15/05
[52] U.S. Cl. ............................. 354/422; 354/435
[58] Field of Search ................ 354/420–423, 354/133, 137, 147, 238.1, 435–439, 459–461

[56] References Cited

U.S. PATENT DOCUMENTS

4,174,897 11/1979 Matsumoto ........................ 354/133
4,350,427 9/1982 Kitai et al. ...................... 354/238.1

Primary Examiner—William B. Perkey
Attorney, Agent, or Firm—Guy W. Shoup

[57] ABSTRACT

A stroboscopic lamp synchronizing device for a photographic camera is disclosed, which includes a first time setting circuit for providing a time instance delayed from an actuation time of a trigger switch by a predetermined time period, a second time setting circuit for setting a time period from said time instance to a time at which a shutter provides a predetermined iris opening, an electromagnet for closing the shutter when actuated after the time set by the second time setting circuit lapses and an X contact, whereby when the X contact is closed upon the actuation of the electromagnet, the iris opening is controlled by the time setting circuits.

2 Claims, 8 Drawing Figures

STROBOSCOPIC LAMP SYNCHRONIZING DEVICE

BACKGROUND OF THE INVENTION

The present invention relates to a stroboscopic lamp synchronizing device and, particularly, to such stroboscopic lamp synchronizing device for a photographic camera adapted to be supplied electrically with a film sensitivity information and an information of a distance between the camera and an object to be photographed.

In the camera art, the so-called flashmatic mechanism has been known which, when a film sensitivity information and an information of a distance between a camera and an object to be photographed are supplied thereto, an iris diameter is automatically set so that a proper exposure can be provided. However, since the flashmatric mechanism has a flashmatic cam and, when supplied mechanically with the film sensitivity information and the distance information, functions to actuate the cam to mechanically control the iris diameter suitably. That is, the flashmatic mechanism is completely mechanical and sophisticated, causing a manufacturing cost to be high.

SUMMARY OF THE INVENTION

An object of the invention is to provide a stroboscopic lamp synchronizing device of a photographic camera which is responsive to a film sensitivity information and a distance between the camera and an objective to be photographed supplied as electric signals to provide a proper iris diameter with respect to a stroboscopic light and to perform other functions corresponding to those to be done by the conventional flashmatic mechanism, with much simpler construction than that of the latter.

The above object can be achieved, according to the present invention, by a provision of a combination of a first time setting circuit for providing an output signal at a time instance delayed by a predetermined time from an actuation of a trigger switch, a second time setting circuit for setting a time from the time instance to a time instance at which an iris diameter of a shutter of a camera becomes a predetermined value, an electromagnet adapted to be actuated, by a driving circuit, to close the shutter when the time set by the second time setting circuit lapses and an X contact for stroboscopic illumination which is closed when the electromagnet is actuation, whereby the iris diameter at the time instance when the X contact is closed is controlled by the first and second time setting circuits.

DETAILED DESCRIPTION OF PREFERRED EMBODIMENTS

Before describing the embodiments of the present invention, it may be helpful to explain a concept of the present invention.

The present invention belongs basically to an electrical automatic exposure control based on the so-called program shutter concept in that a time from an actuation of a trigger switch ganged with a shutter release button of a camera to an actuation of an electromagnet for closing the shutter is controlled by a time constant circuit composed of a capacitor and a resister and in that a stroboscopic tube is actuated in synchronism with an attainment of an appropriate iris diameter upon a closing operation of an X contact adapted to be closed with a closing operation of a member functioning to close shutter blades when the electromagnet is actuated.

When the time from the actuation of the trigger switch to the actuation of the electromagnet is determined by the time constant circuit composed of the capacitor and the resister, there is a certain problem.

Figure 1:
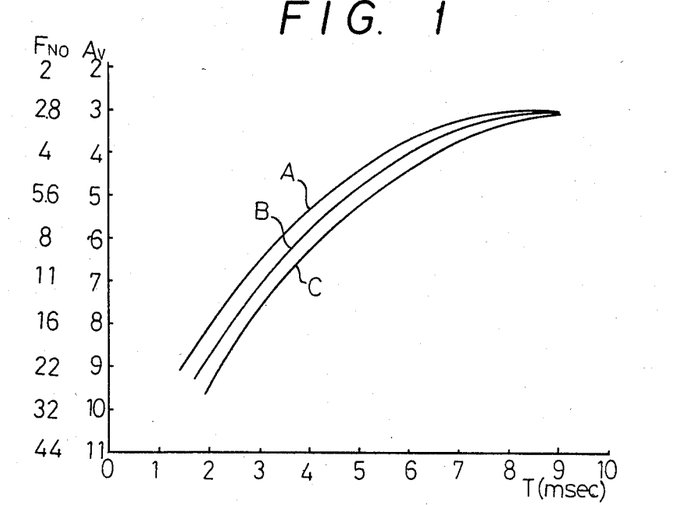
FIG. 1 is a graph showing a variation of the relation of an iris diameter to a time from an actuation of a trigger switch to an actuation of an X contact.
Figure 2:
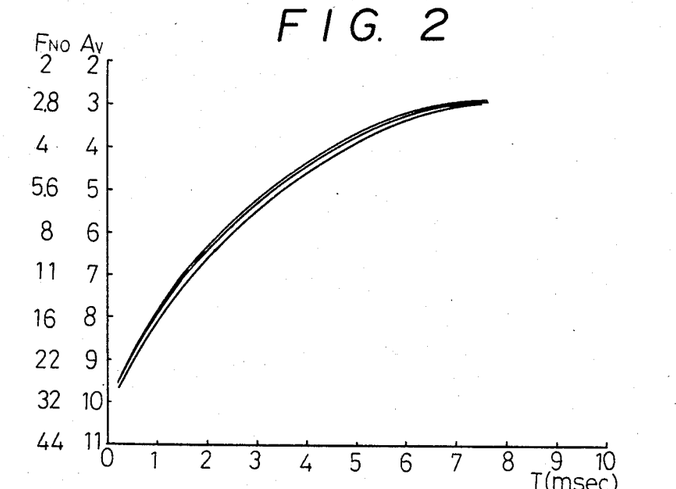
FIG. 2 is a similar graph to that in FIG. 1 except that relation curves are shifted along a time axis to overlap them.

FIG. 1 shows a relation of time T from the actuation of the trigger switch to the actuation of the electromagnet to the iris diameter at a time when the X contact is closed. In FIG. 1, curves A, B and C are the relations for three different cameras of the same type, respectively. As is clear from FIG. 1, the relation is variable camera by camera. However, these curves are similar in nature and, when they are shifted suitably, they can be overlapped. FIG. 2 shows them substantially overlapped by shifting some of them along the time axis.

That is, although the iris diameter is a common function of time for every camera, the relation between the iris diameter and the time measured from the trigger switch actuation is different camera by camera. This is because that a time from the trigger switch actuation to a time at which the shutter blades start to open is different camera by camera and that a time from the actuation of the electromagnet for closing the shutter blades to the closing time of the X contact is also different camera by camera.

In the conventional automatic exposure control device, the above differences in the time from the trigger switch actuation to the starting time of the shutter blade closing operatin and the time from the electromagnet energization to the closing time of the X contact between cameras are important so long as the cameras are regulated, respectively. such that an exposure light amount from the starting time of the shutter blade opening operation to a time at which the shutter blades are closed again is proper. Therefore, in order to perform the flashmatic control electrically in the conventional camera, it is necessary to do it separately from the automatic exposure control.

Now, preferred embodiments of the present invention which are constructed in view of the above state of art will be described.

Figure 3:
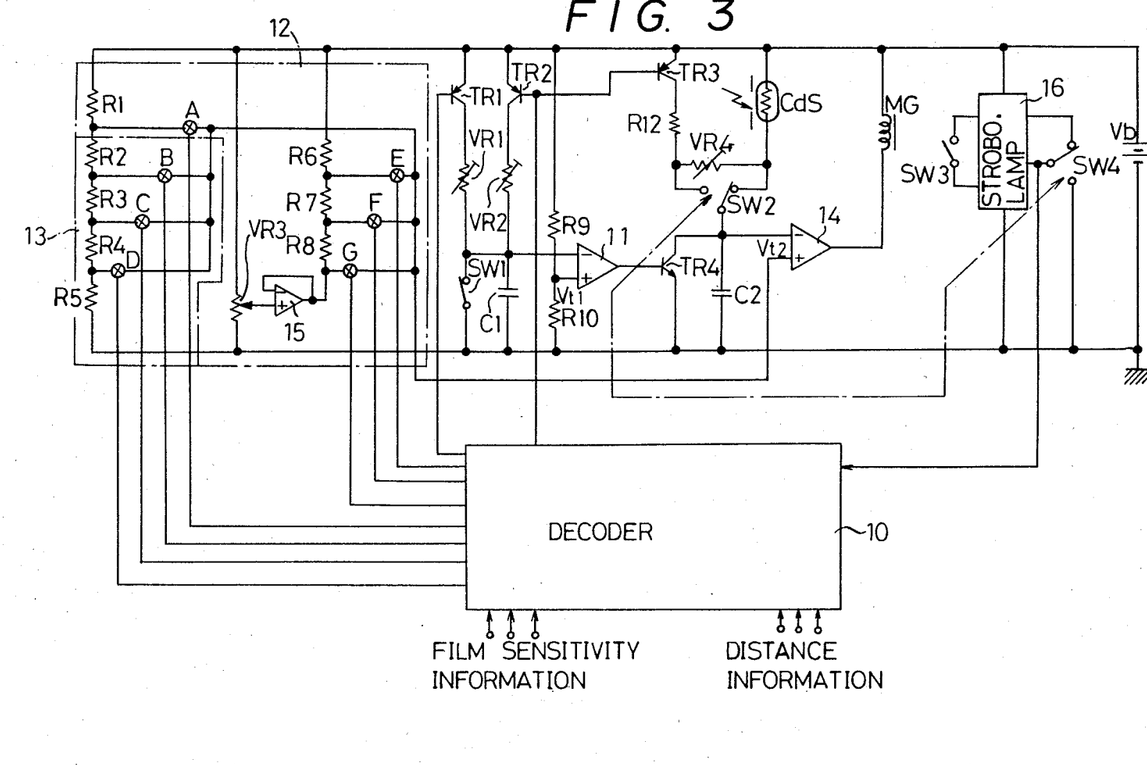
FIG. 3 is a circuit diagram showing an embodiment of the present invention.

In FIG. 3, a stroboscopic lamp syncronizing device according to the present invention includes a first time constant circuit composed of a series circuit of a transistor TR2, a variable resister VR2, a capacitor C1, a transistor TR1 and a variable resister VR1.

A trigger switch SW1 is connected in parallel with the capacitor C1 whose output voltage is applied to an input of a comparator 11 having the other input supplied with a reference voltage Vt1 obtained by dividing a source voltage Vb by means of resisters R9 and R10. A first time setting circuit is constituted with the first time constant circuit and the comparator 11.

The transistors TR1, TR2 and TR3 are on-off controlled by an output of a decoder 10.

The decoder 10 is supplied with a film sensitivity information signal and a distance information signal and provides a signal to a film sensitivity switching portion 12 and an iris changing portion 13. The decoder 10 is also supplied with a switching signal from a switch SW4 for switching between a conventional automatic exposure control operation and a flashmatic operation and functions to turn the transistor TR1 on when the automatic exposure control operation is selected and to turn the transistor TR2 and TR3 on when the flashmatic operation is selected.

When a charge voltage of the capacitor C1 becomes equal to the reference voltage Vt1, the output of the comparator 11 becomes a low level to turn a transistor TR4 off to thereby disconnect it from a capacitor C2. The capacitor C2 constitutes, together with either a resister R12 or a CdS element for receiving a light from an object to be photographed upon a switching operation of a switch SW2 ganged with the switch SW4, a second time constant circuit. A terminal voltage of the capacitor C2 is supplied to a driving circuit 14 of an electromagnet MG.

A variable resister VR4 is connected between contacts of the switch SW2. When the resister R12 is selected by the switch SW2, the time constant of the second time constant circuit is determined by a capacitance of the capacitor C2 and a composite resistance of the CdS element, the variable resister VR4 and the resister R12. The second time constant circuit and the driving circuit 14 constitute a second time setting circuit. The electromagnet MG functions to close the shutter blades when energized by the driving circuit 14. The driving circuit 14 is supplied with a voltage output from the film sensitivity switching portion 12 as a reference voltage which is corrected according to the γ value of the CdS element.

The film sensitivity switching portion 12 and the iris changing portion 13 are constituted with a voltage divider composed of a series connection of the resisters R1, R2, R3, R4 and R5 for dividing the source voltage Vb, a variable resister VR3, a voltage follower 15 for maintaining a voltage of the variable resister VR3 stable, resisters R6, R7 and R8 for driving a suitable correction voltage from the output voltage of the voltage follower 15 and the source voltage Vb and analog-switches A, B, C, D, E, F and G which are on-off controlled by the decoder 10. In a case of the automatic exposure control operation, one of the analog switches is selected according to the film sensitivity information, which is supplied to the driving circuit 14 as a reference voltage Vt2. In a case of the flashmatic operation, one of the analog switches B, C and D is turned on according to the film sensitivity information and the distance information.

A stroboscopic lamp 16 is designed such that, when the switch SW4 is operated to select usual automatic exposure control, the lamp 16 can not be actuated. A trigger switch SW3 functions as the X contact for the stroboscopic lamp 16.

Assuming that the switches SW2 and SW4 are thrown to the automatic exposure control side as shown, the decoder 10 detects the fact and turns the transistor TR1 and selected one of the analog switches A, E, F and G on the change the reference voltage Vt2 of the driving circuit 14.

When the shutter blades start to open upon a depression of the shutter release button, the trigger switch SW1 ganged therewith is turned off. Therefore, the capacitor C1 of the time constant circuit composed of the capacitor and the variable resister VR1 is charged and, when the charge voltage becomes equal to the reference voltage Vt1 of the comparator 11, the transistor TR4 is turned off by an output thereof, resulting in that the capacitor C2 of the second time constant circuit composed of the capacitor C2 and the CdS element is charged through the switch SW2.

When the charge voltage of the capacitor C2 becomes equal to the reference voltage Vt2 of the driving circuit 14, the latter terminates a current supply to the electromagnet MG to thereby render the shutter blades to be closed. In this manner, the time from the start of the shutter opening operation to the closing thereof can be automatically controlled by the time constant determined by the resistance of the CdS element and the capacitance of the capacitor C2, and, hence, the amount of light from the object to obtain a proper exposure.

Then, when the switches SW2 and SW4 are turned to the flashmatic side, the stroboscopic lamp 16 is energized and the transistor TR1 is turned off and the transistors TR2 and TR3 are turned on by the decoder 10. Therefore, the first time constant circuit is established by the variable resister VR2 and the capacitor C1 in circuit. At the same time, the decoder 10 operates in response to the film sensitivity information and the distance information to selectively turn-on one of the analog switches B, C and D to thereby switch the reference voltage Vt2 for the driving circuit steppedly. The trigger switch SW1 ganged with the release button is turned off in response to the starting of the opening motion of the shutter blades to start the charging of the first time constant circuit. When the charge voltage of the capacitor C1 of the first time constant circuit becomes equal to the reference voltage Vt1 of the comparator 11, the transistor TR4 is turned off and charging of the second time constant circuit composed of the capacitor C2 and the resister R12 whose value is selected by the switch SW2. When the charge voltage of the capacitor C2 of the second time constant circuit becomes equal to the reference voltage Vt2 of the driving circuit, the electromagnet MG is deenergized and the shutter blade closing operation is performed. Upon the deenergization of the electromagnet MG, the trigger switch SW3 of the stroboscopic lamp 16 is turned on, so that the lamp 16 emits a stroboscopic light in synchronism therewith, with the iris diameter selected by the decoder.

The light amount of exposure performed by the stroboscopic light from the lamp 16 is controlled by the shutter diameter during the stroboscopic illumination, i.e., the time from the turning-off of the trigger switch SW1 at which the shutter opening is started to the turning on of the X contact. The time is determined by a setting time of the first time setting circuit composed of the first time constant circuit and the comparator 11 and a setting time of the second time setting circuit composed of the second time constant circuit and the driving circuit 14. Since the reference voltage Vt2 of the driving circuit to which the charge voltage of the second time constant circuit is applied is switched upon the selection of one of the analog switches B, C and D according to the film sensitivity information and the distance information supplied to the decoder 10, the time from the starting of the shutter opening operation to the starting of the shutter closing operation, i.e., the shutter diameter for the synchronous illumination of the stroboscopic lamp, is determined by any of the analog switches which has been turned on. When, for example, the analog switch B is selected and turned on, the reference voltage Vt2 of the driving circuit 14 is set to a value by which the aperture diameter corresponding to F3.5 is obtained. Similarly, when the switch C or D is selected, the voltage Vt2 is set to a value by which the diameter corresponding to F8 or F16 is obtained. In such case, it becomes possible to obtain a proper stroboscopic exposure for any opening diameter selected according to the film sensitivity information and the distance information. In order to perform the control of the opening size more finely during the synchronous stroboscopic illumination, it is enough to increase the number of the analog switches and hence the number of the switching steps.

The time T from the turning-off of the trigger switch SW1 to the deenergization of the electromagnet MG can be represented by $$T = T1 + T2$$

where T1 is the setting time of the first time setting circuit and T2 is the setting time of the second time setting circuit which corresponds to the size of the iris.

The above equation can be rewritten by $$T = C1 \cdot R1 \cdot \ln \frac{Vb}{Vb - Vt1} + C2 \cdot R2 \cdot \ln \frac{Vb}{Vb - Vt2}$$

where C1 and R1 are the capacitance and the resistance of the first time constant circuit and C2 and R2 are those of the second time constant circuit, respectively. In the embodiment in FIG. 3, the variable resister VR2 corresponds to the resister R1 of the first time constant circuit and, by adjusting the resister VR2 camera by camera, the setting time T1 is adjusted to accomodate it to the variation of the time from the actuation of the trigger switch to the starting of the shutter opening operation. Also, as mentioned previously, the appropriate iris opening during the synchronous stroboscopic illumination is obtained by changing the reference voltage Vt2 of the driving circuit 14 to thereby change the setting time T2 of the second time setting circuit.

Figure 7:
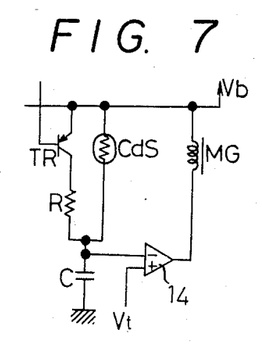
FIG. 7 is a circuit diagram showing an example of a conventional flashmatic mechanism.
Figure 8:
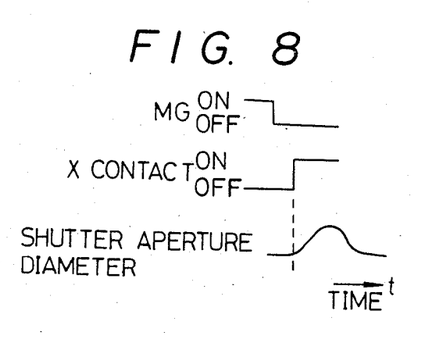
FIG. 8 is a timing chart showing an operation of the circuit in FIG. 7.

Also in the embodiment shown in FIG. 3, it is possible to perform appropriately the so-called day time synchronization. That is, where the stroboscopic illumination is selected by the switch SW2, a series circuit of the CdS element and the variable resister VR4 is inserted in parallel with the resister R12; of the second time constant circuit, so that, when the environmental light condition is bright, the time constant is substantially influenced by the value of the variable resister VR4 and thus the iris opening during the synchronous illumination is largely influenced by the resister VR4. As an example, a circuit construction for performing the day time synchronization has been known which is shown in FIG. 7 in which a transistor TR is turned on by switching the operation mode to the day time synchronization so as to set a resister R in parallel with a CdS element for automatic exposure control. However, in this circuit in which an X contact is turned on by deenergizing an electromagnet MG, when a shutter closing operation is started immediately after a shutter opening operation due to a bright environmental light condition which reduces the resistance value of the CdS element substantially, the X contact may be turned on prior to an actual shutter opening as shown in FIG. 8, causing a proper synchronization to be impossible. Therefore, it is necessary to conduct a complicated mechanical adjustment.

According to the embodiment shown in FIG. 3, such problem as mentioned above is eliminated because the shutter closing operation is delayed until the proper iris opening is obtained upon the determination of the time constant of the second time constant circuit by the adjustment of the variable resister VR4 even when the environmental light condition is high.

Figure 4:
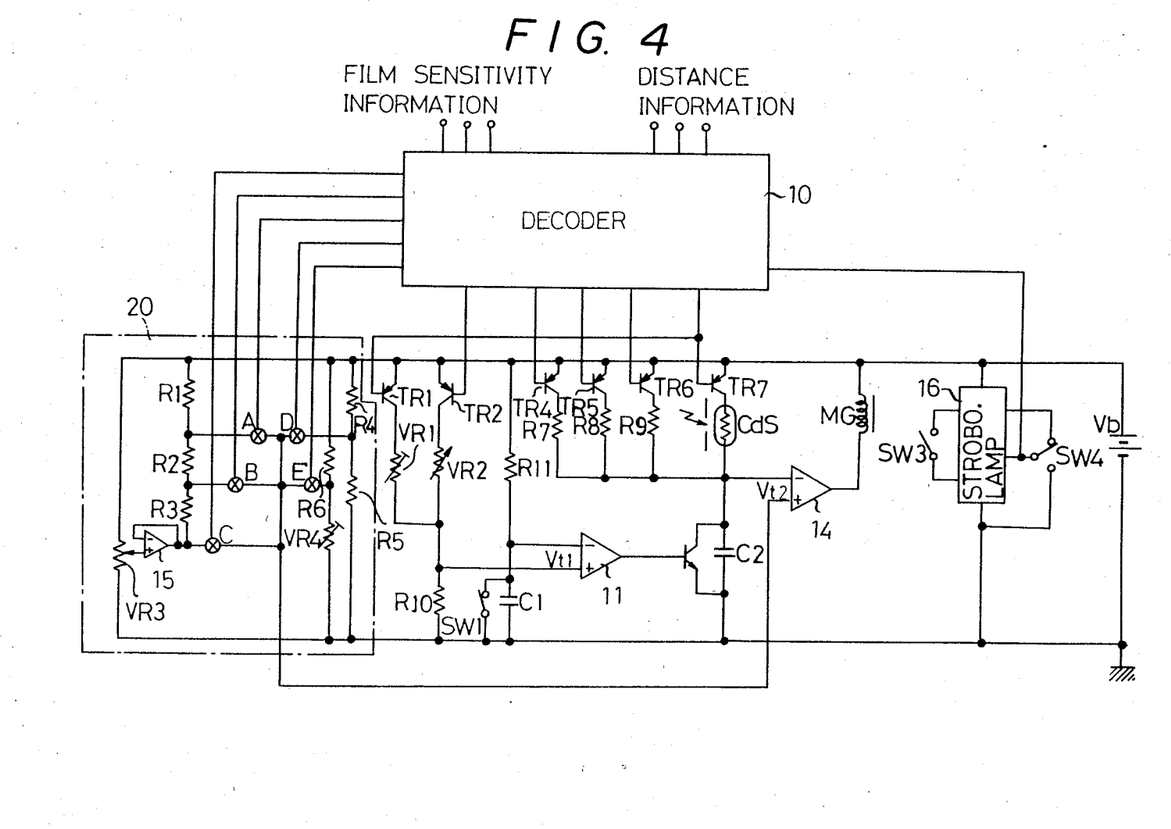
FIG. 4 is a circuit diagram showing another embodiment of the present invention.

FIG. 4 shows another embodiment of the present invention, which is similar to the embodiment in FIG. 3 in that a first time constant circuit is constituted with a resister R11 and a capacitor C1, a first time setting circuit is constituted with the first time constant circuit and a comparator 11, a second time constant circuit is constituted with a CdS element and a capacitor C2 and a second time setting circuit is constituted with the second time constant circuit and a driving circuit 14. The embodiment in FIG. 4 differs from that in FIG. 3 in that a voltage fraction derived from a voltage divider composed of a resister R10 and a variable resister VR1 which is selected upon a turning-on of a transistor TR1 in an automatic exposure control mode operation or derived from a voltage divider composed of the resister R10 and a variable resister VR2 which is selected upon a turning-on of a transistor TR2 in a flashmatic mode operation is supplied to one input of the comparator 11 as a reference voltage Vt1 thereof and a charge voltage of the first time constant circuit is supplied to the other input of the comparator, and in that one of resisters R7, R8 and R9 is selectively inserted in series to the capacitor C2 of the second time constant circuit by turning one of transistors TR4, TR5 and TR6 according to the film sensitivity information and the distance information in the flashmatic mode operation. In the same figure, a reference numeral 20 depicts a circuit for setting a reference voltage Vt2 of the driving circuit 14 which constitutes a film sensitivity and iris opening selection portion in the automatic exposure mode operation, TR7 depicts a transistor which is turned on when the automatic exposure mode is selected for connecting the CdS element to the capacitor C2 of the second time constant circuit, and SW1 is a trigger switch.

In this embodiment, a setting time T1 of the first time setting circuit which is determined correspondingly to a variation of time from a turning-off of the trigger switch SW1 to a starting time of the shutter opening operation camera by camera is regulated by the variable resister VR2 and the iris diameter during the stroboscopic illumination is controlled by changing the setting time of the second time setting circuit by means of a selection of one of the resisters R7, R8 and R9.

The embodiment in FIG. 4 is superior with respect to that shown in FIG. 3 in that a control range of the iris opening in the flashmatic mode operation is widened. That is, when the iris opening during the stroboscopic illumination is changed by changing the reference voltage Vt2 of the driving circuit as in the embodiment in FIG. 3, the range of the reference voltage, i.e., the range of the iris control, is limited because the source voltage Vb is finite. On the contrary, in the embodiment in FIG. 4, the iris opening is controlled by not the reference voltage Vt2 but the charge voltage of the first time constant circuit to be supplied to the other input of the comparator. Therefore, there is no limit in the range of the iris control theoretically.

Figure 5:
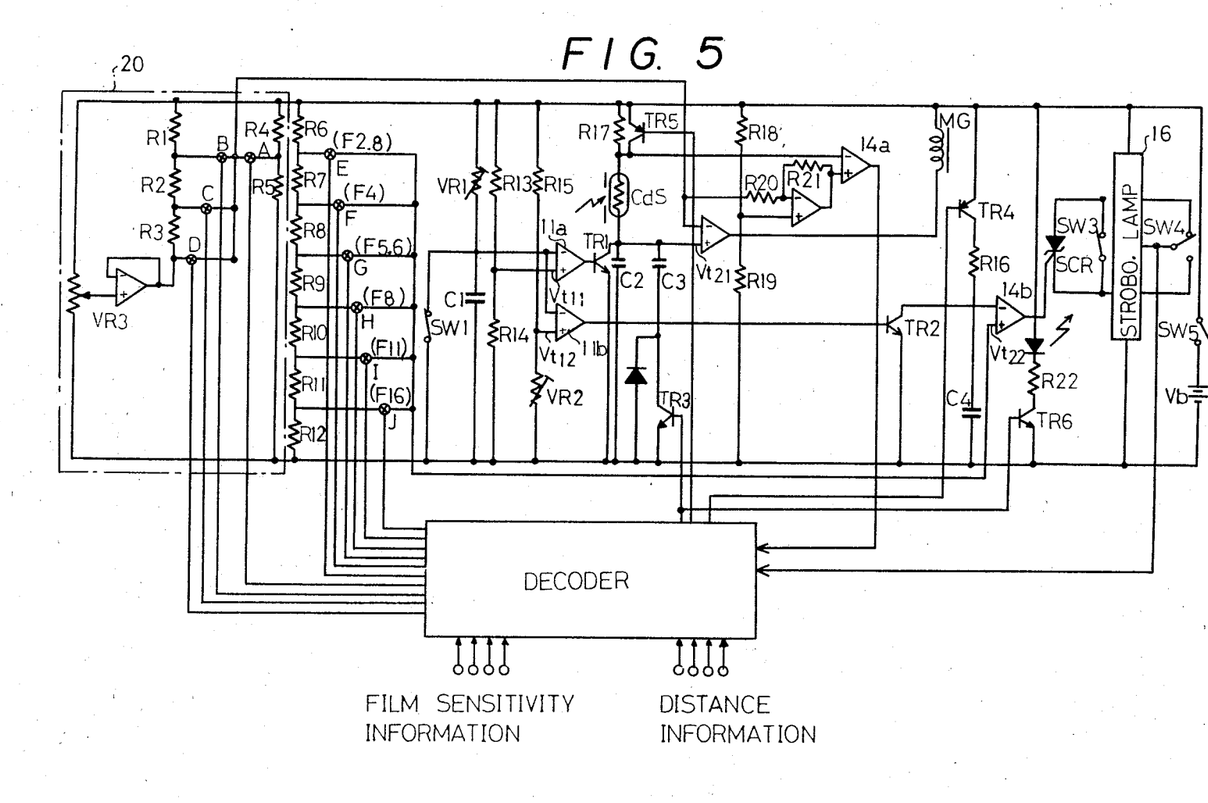
FIG. 5 is a circuit diagram showing a further embodiment of the present invention.

FIG. 5 shows another embodiment of the present invention, in which a time setting circuit for the usual automatic exposure control and a time setting circuit for the flashmatic are provided in parallel which are operated in the flashmatic operation to widen the photographing range and to make a photographing of an environment possible in the flashmatic operation under a low brightness condition. In FIG. 5, reference numerals 11a and 14a show a comparator and a driving circuit for the automatic exposure control, respectively, and 11b and 14b are those for the flashmatic, respectively. Voltage fractions derived from series connected resisters R6, R7, ... R12 constituting a voltage divider are connected to analog switches E, F, G, H, I and J respectively. One of the analog switches is selected by a decoder 10 through which a corresponding voltage fraction is supplied to the driving circuit 14b constituting the second time setting circuit as a reference voltage thereof. A reference voltage Vt11 of the comparator 11a for the automatic exposure is supplied thereto through resisters R13 and R14, to the other input of which a charge voltage of a time constant circuit composed of a variable resister VR1 and a capacitor C1 is supplied. The charge voltage is also supplied to the comparator 11b for the flashmatic and a divided voltage derived from a series connection of a resister R15 and a variable resister VR2 is supplied to the comparator 11b as a reference voltage Vt12.

When the trigger switch SW1 is turned off and the charge voltage of the capacitor C1 becomes equal to the reference voltage Vt11, the transistor TR1 is turned off by an output of the comparator 11a to start a charging of the capacitor C2 through the CdS element. The charge voltage of the capacitor C2 is supplied to the driving circuit 14a to which a reference voltage Vt21 is also supplied from a γ value correction circuit 20 for switching the film sensitivity and for correcting the γ value of the CdS element, according to the film sensitivity. The function of the driving circuit 14a is to energize the electromagnet MG to thereby perform the shutter closing operation.

On the other hand, when the charge voltage of the capacitor C1 becomes equal to the reference voltage Vt12 of the comparator 11b, the latter provides an output by which the transistor TR2 is turned off to open the circuit of the capacitor C4.

The capacitor C4 is charged through a resister R16 and a transistor TR4 which is turned on through the decoder 10 when the flashmatic is selected. When the charge voltage of the capacitor C4 becomes equal to a reference voltage Vt22 of the driving circuit 14b, the latter turns an SCR, connected in parallel with an X contact SW3 functioning as a trigger switch for a stroboscopic lamp 16, on. The decoder 10 functions to turn the transistor TR3 on to thereby connect a capacitor C3 in parallel with the capacitor C2 when the environmental brightness is reduced below a predetermined level, so that the range of the automatic exposure control is widened in the low brightness side.

In the embodiment shown in FIG. 5, when the automatic exposure control mode is selected, the transistor TR5 is turned off. Therefore, the comparator 11b is disconnected, in operation, from the circuit including the driving circuit 14b for the flashmatic mode operation and the shutter is controlled by the first time setting circuit composed of the capacitor C1 and the comparator 11a and the second time setting circuit composed of the CdS element, the capacitor C2 and the driving circuit 14a, whereby it becomes possible to photograph an object with a proper exposure.

Then, when the flashmatic mode is selected, the transistor TR2 is turned on. The charging of the capacitor C1 is started when the trigger switch SW1 is turned off by the commencement of the shutter opening operation. When the charge voltage of the capacitor C1 becomes equal to the reference voltage Vt12 of the comparator 11b, the transistor TR2 is turned off to start the charging of the capacitor C4.

When the charge voltage of the capacitor C4 becomes equal to the reference voltage Vt22, the driving circuit 14b turns the SCR on to allow the stroboscopic lamp 16 to illuminate.

The iris diameter at the time of the stroboscopic illumination is determined by the times set by the first and second time setting circuits as in the same manner as described with reference to the preceeding embodiment. In the embodiment in FIG. 5, the iris diameter at the time of the illumination, i.e., the setting time T2 of the second time setting circuit is changed by changing the reference voltage Vt22 of the driving circuit 14b according to the film sensitivity. For example, it is possible to construct the analog switches E, F, G, H, I and J such that they can supply reference voltages Vt22 corresponding to F2,8, F4, F5,6 F8, F11 and F16, respectively to the driving circuit 14b. Further, it is possible to regulate the time T1 of the first time setting circuit by means of the variable resister VR2.

According to the embodiment shown in FIG. 5, there are several merits obtained in performing the day time synchronization. Firstly, when the environmental brightness is in a high level, the time set by the time setting circuit for the automatic exposure control is predominant over that set by the time setting circuit for the flashmatic operation, so that the trigger switch SW3 is turned on by the deenergization of the electromagnet MG controlled by the driving circuit 14a and the stroboscopic lamp 16 illuminates in synchronism with the iris diameter set at the time.

On the other hand, when the environmental brightness is low, the illumination of the lamp 16 is performed at a time when a desired iris diameter is obtained according to the film sensitivity and the distance informations as mentioned previously. However, since the shutter closing operation is performed on the basis of a light measured by the CdS element, other area than the object to which the stroboscopic light is directed can be also photographed. This effect can not be obtained in the conventional flashmatic system because the stroboscopic lamp illuminates when the shutter blades is actually closing.

Figure 6:
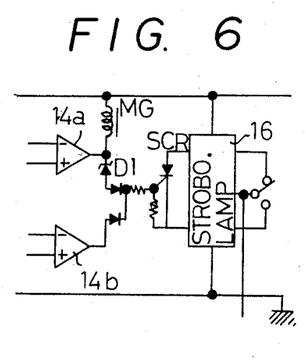
FIG. 6 is a circuit diagram showing a modification of the circuit in FIG. 5.

It should be noted that the trigger switch SW3 of the embodiment in FIG. 5 may be omitted by constituting the circuit such as shown in FIG. 6. In FIG. 6, a single SCR is used as the trigger switch for the stroboscopic lamp, which is turned on by means of the driving circuit 14a for the automatic exposure control and the driving circuit 14b of the flashmatic.

As described hereinbefore, according to the present invention, the stroboscopic synchronizing device comprises a first time setting circuit for providing a signal at a predetermined time after a trigger switch ganged with a release button of a camera is actuated, a second time setting circuit for setting a time from the time at which the first time setting circuit provides the signal to a time at which a shutter provides a predetermined iris diameter, an electromagnet energized through a driving circuit when the time set by the second time setting circuit lapses to close the shutter and an X contact for a stroboscopic illumination adapted to be closed upon an energization of the electromagnet, and operates to control the iris diameter when the X contact is closed by the first and second time setting circuits. Therefore, it is possible to attach the flashmatic function to the camera to which the film sensitivity information is electrically given. Furthermore, since, even when the time from the actuation of the trigger switch to the starting of the shutter opening operation varies camera by camera, it is possible to regulate the times set by the first and second time setting circuits according to the variation, a synchronous stroboscopic illumination becomes possible with a proper iris opening.

What is claimed is:

1. A stroboscopic lamp synchronizing device for a photgraphic camera, comprising:
   a first time setting circuit for providing a first time period starting from an actuation of a shutter release button of the camera;
   a second time setting circuit connected operatively to said first time setting circuit for providing a second time period immediately following said first time period;
   an electromagnet having a solenoid connected to said second time setting circuit, said electromagnet being energized upon said actuation of said shutter release button to start to open a shutter of the camera and deenergized upon a lapse of said second time period to start to close said shutter;
   means connected to said second time setting circuit for varying said second time period in accordance with information supplied to said means indicating sensitivity of a film used and distance to an object to be photographed; and
   an X contact for actuating stroboscopic illumination, said X contact being closed upon deenergization of said electromagnet, whereby said X contact is closed at a time at which said shutter is fully opened with an iris opening determined by said first period and said second time period, the latter being variable with said supplied information.

2. The stroboscopic lamp synchronizing device as claimed in claim 1, wherein said second time period varying means includes a voltage divider circuit connected to said second time setting circuit, and a decoder connected to said voltage divider circuit and responsive to input of film sensitivity and distance information to control said voltage divider circuit such that an output voltage of said voltage divider circuit corresponds to said second time period.

* * * * *